(12) United States Patent
Saito et al.

(10) Patent No.: US 11,655,434 B2
(45) Date of Patent: May 23, 2023

(54) COMPOSITION

(71) Applicant: KAO CORPORATION, Tokyo (JP)

(72) Inventors: Takanori Saito, Kita-ku (JP); Yoichiro Imori, Wakayama (JP); Akihiro Koyama, Adachi-ku (JP); Yukiko Yamawaki, Wakayama (JP)

(73) Assignee: KAO CORPORATION, Tokyo (JP)

( * ) Notice: Subject to any disclaimer, the term of this patent is extended or adjusted under 35 U.S.C. 154(b) by 402 days.

(21) Appl. No.: 16/769,446

(22) PCT Filed: Dec. 5, 2018

(86) PCT No.: PCT/JP2018/044720
§ 371 (c)(1),
(2) Date: Jun. 3, 2020

(87) PCT Pub. No.: WO2019/111947
PCT Pub. Date: Jun. 13, 2019

(65) Prior Publication Data
US 2020/0369985 A1    Nov. 26, 2020

(30) Foreign Application Priority Data
Dec. 6, 2017    (JP) .............................. JP2017-234709

(51) Int. Cl.
| | | |
|---|---|---|
| *C11D 1/02* | (2006.01) | |
| *C11D 1/66* | (2006.01) | |
| *C11D 3/22* | (2006.01) | |
| *C11D 1/83* | (2006.01) | |
| *C11D 11/00* | (2006.01) | |
| *C11D 3/30* | (2006.01) | |
| *C11D 3/37* | (2006.01) | |
| *C11D 1/14* | (2006.01) | |
| *C11D 1/29* | (2006.01) | |
| *C11D 1/72* | (2006.01) | |

(52) U.S. Cl.
CPC ............... *C11D 3/225* (2013.01); *C11D 1/02* (2013.01); *C11D 1/66* (2013.01); *C11D 1/83* (2013.01); *C11D 3/30* (2013.01); *C11D 3/3707* (2013.01); *C11D 11/0017* (2013.01); *C11D 1/143* (2013.01); *C11D 1/29* (2013.01); *C11D 1/72* (2013.01)

(58) Field of Classification Search
CPC .... C11D 1/02; C11D 1/66; C11D 1/83; C11D 3/225; C11D 3/30; C11D 3/3707
USPC ....... 510/340, 341, 356, 357, 470, 473, 475, 510/504, 505, 506
See application file for complete search history.

(56) References Cited

U.S. PATENT DOCUMENTS

| | | | |
|---|---|---|---|
| 4,000,093 A | 12/1976 | Nicol et al. | |
| 4,663,159 A | 5/1987 | Brode, II et al. | |
| 5,948,744 A | 9/1999 | Baillely et al. | |
| 6,068,697 A | 5/2000 | Yamamuro et al. | |
| 6,121,439 A | 9/2000 | Kroon | |
| 6,833,347 B1 | 12/2004 | Wang et al. | |
| 11,359,166 B2 | 6/2022 | Yamawaki et al. | |
| 11,401,350 B2 | 8/2022 | Koyama et al. | |
| 2004/0151681 A1 | 8/2004 | Busk et al. | |
| 2005/0043415 A1 | 2/2005 | Munoz et al. | |
| 2006/0070294 A1 | 4/2006 | Spittle | |
| 2006/0182703 A1 | 8/2006 | Arisz et al. | |
| 2006/0199742 A1 | 9/2006 | Arisz et al. | |
| 2008/0280807 A1* | 11/2008 | Grainger ............. | C11D 3/0015 510/522 |
| 2010/0204079 A1 | 8/2010 | Mcauliffe et al. | |
| 2011/0177018 A1 | 7/2011 | Lipic et al. | |
| 2011/0189248 A1 | 8/2011 | Baldaro et al. | |
| 2011/0268778 A1 | 11/2011 | Dihora et al. | |
| 2011/0268802 A1 | 11/2011 | Dihora et al. | |
| 2011/0269658 A1 | 11/2011 | Dihora et al. | |
| 2011/0274627 A1 | 11/2011 | Alwattari et al. | |
| 2011/0318285 A1 | 12/2011 | Erazo-Majewicz et al. | |

(Continued)

FOREIGN PATENT DOCUMENTS

| | | |
|---|---|---|
| CN | 1209812 A | 3/1999 |
| CN | 101171264 A | 4/2008 |

(Continued)

OTHER PUBLICATIONS

International Search Report (PCT/ISA/210) issued in PCT/JP2018/044718, dated Jan. 15, 2019, with English translation.

(Continued)

*Primary Examiner* — Gregory R DelCotto
(74) *Attorney, Agent, or Firm* — Element IP, PLC

(57) ABSTRACT

The present invention relates a composition capable of enhancing cleaning properties of a soil during cleaning by treating an object.
The composition is a composition containing a modified hydroxyalkyl cellulose and at least one selected from an anionic surfactant and a nonionic surfactant, the modified hydroxyalkyl cellulose being one in which a cationic group and a hydrophobic group represented by the formula (1) are bound to a group resulting from eliminating a hydrogen atom from a hydroxy group of a hydroxyalkyl cellulose.

$$*-Z-R^1 \quad (1)$$

wherein,
Z represents a single bond or a hydrocarbon group having an oxygen atom; $R^1$ represents a hydrocarbon group having 2 or more carbon atoms; and * represents a binding position to a group resulting from eliminating a hydrogen atom from a hydroxy group of a hydroxyalkyl cellulose.

18 Claims, No Drawings

(56) References Cited

U.S. PATENT DOCUMENTS

| | | |
|---|---|---|
| 2013/0130949 A1 | 5/2013 | Partain, III et al. |
| 2013/0209388 A1 | 8/2013 | Erazo-Majewicz et al. |
| 2014/0073777 A1 | 3/2014 | Miyoshi et al. |
| 2014/1444561 | 5/2014 | Hirahara et al. |
| 2015/0239993 A1 | 8/2015 | Miyoshi et al. |
| 2016/0122441 A1 | 5/2016 | Miyoshi et al. |
| 2017/0233683 A1 | 8/2017 | Everaert |
| 2017/0335242 A1 | 11/2017 | Eldredge et al. |
| 2020/0392429 A1 | 12/2020 | Yamawaki et al. |

FOREIGN PATENT DOCUMENTS

| | | |
|---|---|---|
| CN | 101415809 A | 4/2009 |
| CN | 101935357 A | 1/2011 |
| CN | 102391381 A | 3/2012 |
| CN | 103501758 A | 1/2014 |
| CN | 105142731 A | 12/2015 |
| EP | 1100851 B1 | 7/2004 |
| EP | 3722358 A1 | 10/2020 |
| EP | 3722400 A1 | 10/2020 |
| EP | 3722497 A1 | 10/2020 |
| EP | 3722498 A1 | 10/2020 |
| JP | 3-77201 B2 | 12/1991 |
| JP | 6-183939 A | 7/1994 |
| JP | 10-195772 A | 7/1998 |
| JP | 11-106401 A | 4/1999 |
| JP | 2000-80564 A | 3/2000 |
| JP | 2000-178303 A | 6/2000 |
| JP | 2000178303 A | 6/2000 |
| JP | 2001-181301 A | 7/2001 |
| JP | 2003-301376 A | 10/2003 |
| JP | 2004-519519 A | 7/2004 |
| JP | 2004189937 A | 7/2004 |
| JP | 2007-45991 A | 2/2007 |
| JP | 2007031615 A | 2/2007 |
| JP | 2007-145903 A | 6/2007 |
| JP | 2007145903 A | 6/2007 |
| JP | 2008-156764 A | 7/2008 |
| JP | 2008-535937 A | 9/2008 |
| JP | 2013-529644 A | 7/2013 |
| JP | 5552567 B1 | 7/2014 |
| JP | 2014-169417 A | 9/2014 |
| JP | 2015-168666 A | 9/2015 |
| JP | 2015-227412 A | 12/2015 |
| JP | 2016-113724 A | 6/2016 |
| JP | 2019099823 A | 6/2019 |
| JP | 2019099824 A | 6/2019 |
| RU | 2479628 C2 | 4/2013 |
| RU | 2623909 C2 | 6/2017 |
| WO | WO-9829528 A2 | 7/1998 |
| WO | WO-2006094582 A1 | 9/2006 |
| WO | WO-2007120547 A1 | 10/2007 |
| WO | WO-2011121073 A1 | 10/2011 |
| WO | WO 2012/021626 A2 | 2/2012 |
| WO | WO 2013/068771 A1 | 5/2013 |
| WO | WO 2014/087968 A1 | 6/2014 |
| WO | WO 2016/077207 A1 | 5/2016 |
| WO | WO-2017142869 A1 | 8/2017 |

OTHER PUBLICATIONS

International Search Report (PCT/ISA/210) issued in PCT/JP2018/044721, dated Feb. 12, 2019, with English translation.

International Search Report (PCT/ISA/210) issued in PCT/JP2018/044722, dated Feb. 12, 2019, with English translation.

Aug. 11, 2022 Office Action issued in U.S. Appl. No. 16/769,424, 32 pages.

Extended European Search Report dated Aug. 9, 2021 in Patent Application No. 18886444.1, 8 pages.

Extended European Search Report dated Jul. 26, 2021 in Patent Application No. 18885583.7.

Neda Beheshti et al, "Interaction behaviors in aqueous solutions of negatively and positively charged hydrophobically modified hydroxyethylcellulose in the presence of an anionic surfactant", Colloids and Surfaces A: Physiochemical and Engineering Aspects, 328, 2008, p. 79-89.

Sumei Yao (editor), Basic Chemistry (2nd Edition), Aug. 2017, p. 218, Ocean Press, Beijing, P. R. China.

A.D. Alekseev et al, "Influence of Surfactants on Capacity of Low-Phosphatic Technical Detergents", Belarusian State Technological University, No. 2, 2017, pp. 159-163 (with English abstract).

Combined Office Action and Search Report dated Nov. 18, 2021 in Russian Patent Application No. 2020118530, 10 pages (with English translation).

Combined Office Action and Search Report dated Nov. 18, 2021 in Russian Patent Application No. 2020118531, 9 pages (with English translation).

V. M. Sutvagin et al. Khimiya i fizika polymerov: Uchebnoe posobie (Chemistry and Physics of Polymers: a Textbook).—Tomsk: TPU publishers, 2003, 6 pages.

Extended European Search Report dated Aug. 4, 2021 in Patent Application No. 18885732.0, 8 pages.

Supplementary European Search Report dated Aug. 18, 2021 in Patent Application No. 18886039.9, 6 pages.

Aug. 18, 2021 Office Action issued in U.S. Appl. No. 16/769,527, 10 pages.

Oct. 4, 2021 Office Action issued in U.S. Appl. No. 16/769,542, 8 pages.

International Search Report (PCT/ISA/210) issued in PCT/JP2018/044720, dated Mar. 5, 2019.

\* cited by examiner

COMPOSITION

FIELD OF THE INVENTION

The present invention relates to a composition.

BACKGROUND OF THE INVENTION

A polysaccharide derivative is used as a blending component of hair cleansing agent compositions, such as a shampoo, a rinse, a treatment, and a conditioner, or cleaning agent compositions of clothes, and its applications include many divergences.

JP 2000-178303 A (PTL 1) describes, as a laundry finishing agent, a polysaccharide derivative substituted with specified alkyl group, carboxymethyl group, and cationic group.

JP 2015-168666 (PTL 2) describes an aqueous hair cleansing agent containing specified surfactant, cationic group-containing cellulose ether, and glyceryl ether.

JP 2013-529644 A (PTL 3) discloses a personal care composition additive including a specified substantive polymer selected from a polysaccharide and a synthetic polymer containing a cationic monomer.

SUMMARY OF THE INVENTION

The present invention relates to the following <1>.
<1> A composition containing a modified hydroxyalkyl cellulose and at least one selected from an anionic surfactant and a nonionic surfactant, the modified hydroxyalkyl cellulose being one in which a cationic group and a hydrophobic group represented by the formula (1) are bound to a group resulting from eliminating a hydrogen atom from a hydroxy group of a hydroxyalkyl cellulose.

$$*-Z-R^1 \qquad (1)$$

In the formula (1). Z represents a single bond or a hydrocarbon group having an oxygen atom; $R^1$ represents a hydrocarbon group having 2 or more carbon atoms; and * represents a binding position to a group resulting from eliminating a hydrogen atom from a hydroxy group of a hydroxyalkyl cellulose.

DETAILED DESCRIPTION OF THE INVENTION

As a composition for surface treatment of clothing and the like, a composition capable of enhancing cleaning properties of a soil during cleaning is demanded. However, the conventional agents have not been able to exhibit a sufficient performance.

The present invention relates to a composition capable of enhancing cleaning properties of a soil during cleaning by treating an object.

The present inventors have found that the aforementioned problem can be solved by a specified composition.

In the following description, the "cleaning performance" means a performance of enhancing easiness of soil removal during cleaning.

[Composition]

The composition of the present invention contains a modified hydroxyalkyl cellulose (hereinafter also referred to as "modified hydroxyalkyl cellulose of the present invention") and at least one selected from an anionic surfactant and a nonionic surfactant, the modified hydroxyalkyl cellulose being one in which a cationic group and a hydrophobic group represented by the formula (1) are bound to a group resulting from eliminating a hydrogen atom from a hydroxy group of a hydroxyalkyl cellulose.

$$*-Z-R^1 \qquad (1)$$

In the formula (1), Z represents a single bond or a hydrocarbon group having an oxygen atom; $R^1$ represents a hydrocarbon group having 2 or more carbon atoms; and * represents a binding position to a group resulting from eliminating a hydrogen atom from a hydroxy group of a hydroxyalkyl cellulose.

The present inventors have found that when a composition of the present invention, such as the cleaning agent composition containing the modified hydroxyalkyl cellulose and at least one selected from an anionic surfactant and a nonionic surfactant is treated on an object, such as clothing, easiness of soil removal during cleaning is enhanced. Although a detailed action mechanism thereof is not elucidated yet, it is partly estimated as follows.

The modified hydroxyalkyl cellulose which the composition of the present invention contains has both a cationic group and a hydrophobic group, and therefore, it may be considered that when the modified hydroxyalkyl cellulose adsorbs on the surface of an object, such as clothing, it provides uniform and appropriate hydrophilicity to the surface. And, it may be estimated that the modified hydroxyalkyl cellulose undergoes an electrostatic interaction with an anionic surfactant or a hydrophobic interaction with a nonionic surface, to efficiently adsorb on the surface, and therefore, the surface is modified in such a state that a soil is readily removed, and a cleaning effect is enhanced.

<Modified Hydroxyalkyl Cellulose>

In the modified hydroxyalkyl cellulose of the present invention, a cationic group and a hydrophobic group represented by the formula (1) are bound to a group resulting from eliminating a hydrogen atom from a hydroxy group of a hydroxyalkyl cellulose.

$$*-Z-R^1 \qquad (1)$$

In the formula (1), Z represents a single bond or a hydrocarbon group having an oxygen atom; $R^1$ represents a hydrocarbon group having 2 or more carbon atoms; and * represents a binding position to a group resulting from eliminating a hydrogen atom from a hydroxy group of a hydroxyalkyl cellulose.

From the viewpoint of cleaning performance, a hydroxyalkyl group which the hydroxyalkyl cellulose has is preferably at least one selected from a hydroxyethyl group and a hydroxypropyl group, more preferably only a hydroxyethyl group or a hydroxypropyl group, and still more preferably only a hydroxyethyl group. The hydroxyalkyl cellulose may have both a hydroxyethyl group and a hydroxypropyl group, and it preferably has either one of them, and more preferably has only a hydroxyethyl group.

From the viewpoint of cleaning performance, the hydroxyalkyl cellulose is preferably hydroxyethyl cellulose (hereinafter also referred to "HEC"), hydroxypropyl cellulose, or hydroxybutyl cellulose, more preferably HEC or hydroxypropyl cellulose, and still more preferably HEC.

From the viewpoint of cleaning performance, the modified hydroxyalkyl cellulose of the present invention is preferably modified hydroxyethyl cellulose (hereinafter also referred to as "modified HEC"), modified hydroxypropyl cellulose, or a modified hydroxybutyl cellulose, more preferably modified HEC or modified hydroxypropyl cellulose, and still more preferably modified HEC.

From the viewpoint of solubility, a degree of substitution of the hydroxyalkyl group in the hydroxyalkyl cellulose is preferably 0.1 or more, more preferably 0.5 or more, still more preferably 1 or more, and yet still more preferably 1.5 or more, and from the viewpoint of cleaning performance, it is preferably 10 or less, more preferably 8 or less, still more preferably 5 or less, and yet still more preferably 3 or less.

In the present invention, the degree of substitution of an X group is a molar average degree of substitution of the X group and means a number of substitutions of the X group per the constituent monosaccharide unit of cellulose. For example, the "degree of substitution of the hydroxyethyl group" means an average molar number of the hydroxyethyl group introduced (bound) per mol of the anhydroglucose unit.

In the case where the hydroxyalkyl cellulose has both a hydroxyethyl group and a hydroxypropyl group, the degree of substitution of the hydroxyalkyl group refers to a sum total of the degree of substitution of the hydroxyethyl group and the degree of substitution of the hydroxypropyl group.

(Weight Average Molecular Weight)

In the present invention, from the viewpoint of cleaning performance, the weight average molecular weight of the hydroxyalkyl cellulose is preferably 1,000 or more, more preferably 10,000 or more, still more preferably 30,000 or more, yet still more preferably 50,000 or more, even yet still more preferably 70,000 or more, even still more preferably 100,000 or more, and even still more further more preferably 130,000 or more, and from the viewpoint of solubility in the composition, it is preferably 3,000,000 or less, more preferably 1,500,000 or less, still more preferably 1,200,000 or less, yet still more preferably 790,000 or less, even yet still more preferably 600,000 or less, even still more preferably 500,000 or less, and even still more further more preferably 400.000 or less.

In the case where the hydroxyalkyl cellulose is procured as a product and provided for use, published values by a manufacturer may be adopted.

(Cationic Group)

In the modified hydroxyalkyl cellulose of the present invention, a cationic group is bound to a group resulting from eliminating a hydrogen atom from a hydroxy group of the aforementioned hydroxyalkyl cellulose. The aforementioned hydroxy group includes a hydroxy group which the hydroxyalkyl group bound to the cellulose has and a hydroxy group which glucose forming a cellulose structure has (a hydroxy group to which the hydroxyalkyl group is not bound).

The cationic group which the modified hydroxyalkyl cellulose has preferably includes a quaternary ammonium cation, and is preferably represented by the following formula (2-1) or formula (2-2) as a whole.

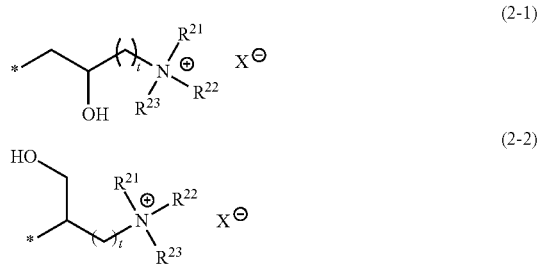

In the formula (2-1) and formula (2-2), $R^{21}$ to $R^{23}$ each independently represent a hydrocarbon group having 1 or more and 4 or less carbon atoms; $X^-$ represents an anion; t represents an integer of 0 or more and 3 or less; and * represents a binding position to a group resulting from eliminating a hydrogen atom from a hydroxy group of the hydroxyalkyl cellulose.

$R^{21}$ to $R^{23}$ are each independently preferably a linear or branched hydrocarbon group having 1 or more and 4 or less carbon atoms, and more preferably a methyl group or an ethyl group. Still more preferably, all of $R^{21}$ to $R^{23}$ are a methyl group or an ethyl group, and yet still more preferably, all of $R^{21}$ to $R^{23}$ are a methyl group.

t is preferably an integer of 1 or more and 3 or less, more preferably 1 or 2, and still more preferably 1.

$X^-$ is a counter ion of the quaternary ammonium cation, and examples thereof include an alkyl sulfate ion having 1 or more and 3 or less carbon atoms, a sulfate ion, a phosphate ion, a carboxylate ion having 1 or more and 3 or less carbon atoms (e.g., a formate ion, an acetate ion, and a propionate ion), and a halide ion.

Of these, from the viewpoint of easiness of production and easiness of raw material availability, $X^-$ is preferably at least one selected from a methyl sulfate ion, an ethyl sulfate ion, a chloride ion, and a bromide ion, and from the viewpoint of solubility in water and chemical stability of the resulting modified hydroxyalkyl cellulose, $X^-$ is more preferably a chloride ion.

$X^-$ may be used alone or in combination of two or more thereof.

The group represented by the formula (2-1) or formula (2-2) can be obtained by using an introducing agent of the cationic group (hereinafter also referred to as "cationizing agent"). Examples of the cationizing agent include a glycidyltrialkylammonium chloride and a 3-chloro-2-hydroxypropyltrialkylammonium chloride, and from the viewpoint of easiness of raw material availability and chemical stability, a glycidyltrialkylammonium chloride is preferred.

These cationizing agents can be used alone or in combination of two or more thereof.

From the viewpoint of cleaning performance, a degree of substitution of the cationic group (hereinafter also referred as "$MS_C$") in the modified hydroxyalkyl cellulose of the present invention is preferably 0.001 or more, more preferably 0.005 or more, still more preferably 0.01 or more, yet still more preferably 0.02 or more, even yet still more preferably 0.05 or more, and even still more preferably 0.07 or more, and it is preferably 1 or less, more preferably 0.7 or less, still more preferably 0.4 or less, yet still more preferably 0.35 or less, even yet still more preferably 0.3 or less, even still more preferably 0.25 or less, even still more further preferably 0.2 or less, even yet still more further preferably 0.15 or less, and even yet still more further preferably 0.1 or less.

The degree of substitution of the cationic group can be measured by the method described in the section of Examples.

(Hydrophobic Group)

In the modified hydroxyalkyl cellulose of the present invention, a hydrophobic group represented by the following formula (1) is bound to a group resulting from eliminating a hydrogen atom from a hydroxy group of the aforementioned hydroxyalkyl cellulose.

In the formula (1), Z represents a single bond or a hydrocarbon group having an oxygen atom; $R^1$ represents a hydrocarbon group having 2 or more carbon atoms; and * represents a binding position to a group resulting from eliminating a hydrogen atom from a hydroxy group of a hydroxyalkyl cellulose.

From the viewpoint of cleaning performance. $R^1$ is preferably an alkyl group or an alkenyl group, more preferably an alkyl group, still more preferably a linear or branched alkyl group, and yet still more preferably a linear alkyl group.

From the viewpoint of cleaning performance, the carbon number of $R^1$ is 2 or more, preferably 4 or more, more preferably 6 or more, still more preferably 8 or more, and yet still more preferably 10 or more, and it is preferably 24 or less, more preferably 22 or less, still more preferably 18 or less, yet still more preferably 16 or less, and even yet still more preferably 14 or less.

$R^1$ is defined such that the carbon number of the hydrocarbon group becomes maximum. In consequence, in the formula (1), the atom in Z bound to $R^1$ is, for example, an oxygen atom, carbonate carbon, a carbon atom to which a hydroxy group is bound, or a carbon atom to which a hydroxyalkyl group is bound.

From the viewpoint of cleaning performance, a molar average carbon number of $R^1$ is preferably 4 or more, more preferably 7 or more, and still more preferably 10 or more, and it is preferably 24 or less, more preferably 18 or less, and still more preferably 14 or less. The molar average carbon number of $R^1$ is a molar average value of the carbon number distribution in $R^1$. The molar average carbon number of $R^1$ can be, for example, measured through gas chromatography (GC).

From the viewpoint of cleaning performance, a proportion of the hydrocarbon group having 9 or more carbon atoms in the hydrocarbon group $R^1$ is preferably 25 mol % or more, more preferably 50 mol % or more, still more preferably 70 mol % or more, and yet still more preferably 90 mol % or more, and it is preferably 100 mol % or less, and it may also be 100 mol %.

The proportion of the hydrocarbon group having 9 or more carbon atoms can be, for example, measured through GC.

Z represents a single bond or a hydrocarbon group having an oxygen atom. The aforementioned hydrocarbon group is preferably an alkylene group; a part of methylene groups of the alkylene group may be substituted with an ether bond, a part of the methylene groups may be substituted with a carbonyl group (—C(=O)—); and a part of a hydrogen atoms of the alkylene group may be substituted with a hydroxy group, an alkyl group, or a hydroxyalkyl group.

In the case where Z is a hydrocarbon group having an oxygen atom (hereinafter also referred to as "hydrocarbon group (Z)"), the hydrocarbon group (Z) preferably includes an epoxy group-derived group, an oxyglycidyl group-derived group, or group derived from a carboxylic acid (or its anhydride), and from the viewpoint of cleaning performance, the hydrocarbon group (Z) more preferably includes an oxyglycidyl group-derived group.

The group represented by the formula (1) more preferably includes any one of groups represented by the following formulae (1-1-1) to (1-4).

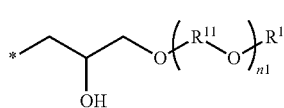
(1-1-1)

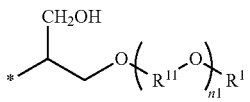
(1-1-2)

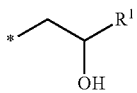
(1-2-1)

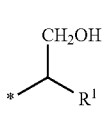
(1-2-2)

*—$R^1$ (1-3)

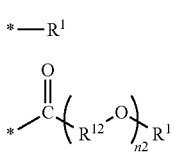
(1-4)

In the formula (1-1-1) to formula (1-4), $R^{11}$ and $R^{12}$ each independently represent an alkylene group having 2 to 4 carbon atoms; $R^1$ is synonymous with $R^1$ in the formula (1); * represents a binding position to a group resulting from eliminating a hydrogen atom from a hydroxy group of the hydroxyalkyl cellulose; n1 represents an addition molar number of —$R^{11}$—O—; n2 represents an addition molar number of —$R^{12}$—O—; and n1 and n2 are each an integer of 0 or more and 30 or less.

A preferred embodiment of $R^1$ in the formula (1-1-1) to formula (1-4) is synonymous with $R^1$ in the formula (1). The groups resulting from eliminating $R^1$ from the formula (1-1-1) to formula (1-4) are preferred embodiments of the hydrocarbon group Z.

$R^{11}$ and $R^{12}$ are each independently preferably an ethylene group or a propylene group, and more preferably an ethylene group. The carbon number of each of $R^{11}$ and $R^{12}$ is preferably 2 or more and 3 or less. In the case where a plurality of each of $R^{11}$ and $R^{12}$ exist, they may be the same as or different from each other, respectively. n1 and n2 are each preferably 20 or less, more preferably 10 or less, still more preferably 5 or less, yet still more preferably 3 or less, and even yet still more preferably 1 or less, and they may be 0 or more, and even still more preferably 0.

In the case where the group represented by the formula (1) contains at least one group selected from a group represented by the formula (1-1-1) and a group represented by the formula (1-1-2), from the viewpoint of soil release performance, an average addition molar number of —$R^{11}$—O— is preferably 20 or less, more preferably 10 or less, still more preferably 5 or less, yet still more preferably 3 or less, and even yet still more preferably 1 or less, and it is preferably 0 or more.

In the case where the group represented by the formula (1) contains a group represented by the formula (1-4), from the viewpoint of soil release performance, an average addition molar number of —$R^{12}$—O— in the formula (1-4) is preferably 20 or less, more preferably 10 or less, still more preferably 5 or less, yet still more preferably 3 or less, and even yet still more preferably 1 or less, and it is preferably 0 or more.

The formula (1-1-1) and formula (1-1-2) are each a group derived from a glycidyl ((poly)alkyleneoxy)hydrocarbyl ether, and Z is a group derived from an oxyglycidyl group or a (poly)alkyleneoxyglycidyl group. The group represented by the formula (1-1-1) or formula (1-1-2) is obtained by using, as an introducing agent (hereinafter also referred to as "hydrophobizing agent") of the hydrophobic group, a glycidyl (alkyleneoxy)hydrocarbyl ether, preferably a glycidyl (alkyleneoxy)alkyl ether, and more preferably a glycidyl alkyl ether.

The formula (1-2-1) and formula (1-2-2) are each a group in which Z is derived from an epoxy group. The group represented by each of the formula (1-2-1) and formula (1-2-2) is obtained by using, as a hydrophobizing agent, a terminal-epoxidized hydrocarbon, and preferably a terminal-epoxidized alkane.

The formula (1-3) is the case where the hydrophobic group is bound directly to a group resulting from eliminating a hydrogen atom from a hydroxy group of the hydroxyalkyl cellulose. The group represented by the formula (1-3) is obtained by using, as a hydrophobizing agent, a halogenated hydrocarbon.

The formula (1-4) contains a group in which Z contains a carbonyl group. The group represented by the formula (1-4) is obtained by using, as a hydrophobizing agent, $R^1$—C(=O)—OH, $R^1$—C(=O)-A (A represents a halogen atom), $R^1$—C(=O)—O—C(=O)—$R^1$, or the like.

Of these, from the standpoint that a salt is not formed as a by-product during production of the modified hydroxyalkyl cellulose as well as the viewpoint of cleaning performance, the group represented by the formula (1) is preferably the group represented by the formula (1-1-1), formula (1-1-2), formula (1-2-1), or formula (1-2-2), and more preferably the group represented by the formula (1-1-1) or formula (1-1-2).

In the hydrophobic group represented by the formula (1), the total content of the hydrophobic group represented by the formula (1-1-1), the hydrophobic group represented by the formula (1-1-2), the hydrophobic group represented by the formula (1-2-1), the hydrophobic group represented by the formula (1-2-2), the hydrophobic group represented by the formula (1-3), and the hydrophobic group represented by the formula (1-4) is preferably 50 mol %, more preferably 80 mol % or more, and still more preferably 90 mol % or more, and it is 100 mol % or less, and still more preferably 100 mol %.

From the viewpoint of cleaning performance, a degree of substitution of the hydrophobic group (hereinafter also referred to as "$MS_R$") in the modified hydroxyalkyl cellulose is preferably 0.0001 or more, more preferably 0.001 or more, still more preferably 0.005 or more, yet still more preferably 0.008 or more, even yet still more preferably 0.01 or more, and even still more preferably 0.015 or more, and from the viewpoint of solubility, it is preferably 1 or less, more preferably 0.4 or less, still more preferably 0.2 or less, yet still more preferably 0.1 or less, even yet still more preferably 0.08 or less, even still more preferably 0.06 or less, even still more further preferably 0.05 or less, even yet still more further preferably 0.04 or less, and even yet still more further preferably 0.03 or less.

The degree of substitution of the hydrophobic group can be measured by the method described in the section of Examples.

In the present invention, from the viewpoint of cleaning performance, a ratio ($MS_R/MS_C$) of the degree of substitution ($MS_R$) of the hydrophobic group to the degree of substitution ($MS_C$) of the cationic group in the modified hydroxyalkyl cellulose is preferably 0.001 or more, more preferably 0.005 or more, still more preferably 0.01 or more, and yet still more preferably 0.05 or more, and it is preferably 10 or less, more preferably 5 or less, still more preferably 3 or less, yet still more preferably 2 or less, even still more preferably 1.2 or less, even still more preferably 0.8 or less, even still more further preferably 0.6 or less, even yet still more further preferably 0.5 or less, and even yet still more further preferably 0.3 or less.

In the present invention, from the viewpoint of cleaning performance, it is preferred that the hydrophobic group and the cationic group are each bound to a group resulting from eliminating a hydrogen atom of a different hydroxy group which the hydroxyalkyl cellulose has. That is, it is preferred that the hydroxyalkyl cellulose is not a hydroxyalkyl cellulose having the hydrophobic group and the cationic group on one side chain. In other words, it is preferred that the hydrophobic group and the cationic group are bound on a different side chain of the hydroxyalkyl cellulose.

The modified hydroxyalkyl cellulose of the present invention may have an anionic group. From the viewpoint of cleaning performance, a ratio ($MS_A/MS_C$) of a degree of substitution of the anionic group (hereinafter also reference to as "$MS_A$") to the degree of substitution of the cationic group in the modified hydroxyalkyl cellulose is preferably 3 or less, more preferably 1.7 or less, still more preferably 1.5 or less, yet still more preferably 1 or less, even yet still more preferably 0.5 or less, and even still more preferably 0.1 or less, and it may be 0 or more, and even yet still more further preferably 0.

From the viewpoint of the cleaning performance, the $MS_A$ is preferably less than 0.01, and more preferably 0.001 or less.

In the case where the modified hydroxyalkyl cellulose has the anionic group, examples of the anionic group include a carboxymethyl group.

The introduction reaction of the carboxymethyl group (carboxymethylation reaction) is performed by allowing the hydroxyalkyl cellulose to react with a monohalogenated acetic acid and/or its metal salt in the presence of a basic compound.

Specifically, examples of the monohalogenated acetic acid and the monohalogenated acetic acid metal salt include monochloroacetic acid, sodium monochloroacetate, potassium monochloroacetate, sodium monobromoacetate, and potassium monobromoacetate. Such a monohalogenated acetic acid and its metal salt can be used either alone or in combination of two or more thereof.

In the present invention, the modified hydroxyalkyl cellulose may have a glycerol group as a substituent. From the viewpoint of cleaning performance, a degree of substitution of the glycerol group is preferably less than 0.5, and more preferably less than 0.1, and it may be 0 or more, and still more preferably 0.

The modified hydroxyalkyl cellulose having a glycerol group is, for example, obtained by allowing a glycerolizing agent to act in a production process of the modified hydroxyalkyl cellulose as mentioned later. Examples of the glycerolizing agent include glycidol, 3-chloro-1,2-propanediol, 3-bromo-1,2-propanediol, glycerin, and glycerin carbonate. Of these, glycidol is preferred from the standpoint that a salt is not formed as a by-product as well as the viewpoint of reactivity.

<Production Method of Modified Hydroxyalkyl Cellulose>

It is preferred to obtain the modified hydroxyalkyl cellulose of the present invention by allowing the hydroxyalkyl cellulose to react with the cationizing agent and the hydrophobizing agent, thereby introducing the cationic group and the hydrophobic group.

It is preferred that all of the introduction reaction of the cationic group (hereinafter also referred to as "cationization reaction") and the introduction reaction of the hydrophobic group (hereinafter also referred to as "hydrophobization reaction") in the coexistence of a basic compound. From the viewpoint of reaction rate in introduction reaction, the basic compound is preferably an alkali metal hydroxide, and more preferably sodium hydroxide or potassium hydroxide.

From the viewpoint of reactivity, the aforementioned reaction may be performed in the presence of a nonaqueous solvent. Examples of the nonaqueous solvent include a polar solvent, such as 2-propanol.

After the reaction, the basic compound can be neutralized with an acid. Examples of the acid include an inorganic acid, such as phosphoric acid, and an organic acid, such as acetic acid.

The resulting modified hydroxyalkyl cellulose may be purified through filtration, washing, or the like, as the need arises.

<Anionic Surfactant>

The composition of the present invention contains at least one selected from an anionic surfactant and a nonionic surfactant as mentioned later.

Examples of the anionic surfactant include a terminal anionic surfactant in which an anionic group is bound to a hydrophobic group of a surfactant, preferably a primary carbon atom of an alkyl group or a phenyl group; and an internal anionic surfactant in which an anionic group is bound to a hydrophobic group, preferably a secondary carbon atom of an alkyl group.

Examples of the terminal anionic surfactant include at least one anionic surfactant selected from an alkylbenzenesulfonate (LAS), an α-olefin sulfonate, an alkyl sulfate ester salt (AS), a polyoxyalkylene alkyl ether sulfate (AES), an α-sulfo fatty acid ester salt, and a fatty acid salt. Examples of the internal anionic surfactant include internal olefin sulfate olefin body (IOS) and hydroxy body (HAS), as described in paragraph [0011] of JP 2015-028123 A.

Of these, at least one anionic surfactant selected from LAS, AS, AES, IOS, and HAS is preferred from the viewpoint of cleaning performance. The carbon number of the alkyl group of the terminal anionic surfactant is preferably 8 or more, more preferably 10 or more, and still more preferably 12 or more, and it is preferably 18 or less, more preferably 16 or less, and still more preferably 14 or less. The carbon number of the alkyl group of the internal anionic surfactant is preferably 12 or more, more preferably 14 or more, and still more preferably 16 or more, and it is preferably 24 or less, more preferably 22 or less, and still more preferably 18 or less. The oxyalkylene group which AES has is preferably an ethyleneoxy group, and an average addition molar number thereof is preferably 0.5 or more, and more preferably 1 or more, and it is preferably 10 or less, and more preferably 5 or less.

As the salt of the anionic surfactant, a sodium salt, a potassium salt, and an ammonium salt are preferred. The use of the anionic surfactant is preferred from the viewpoint of the fact that the laundry liquid is slimy.

In the present invention, the anionic surfactant may be AS or AES represented by the following formula (13).

$$R^{51}O(A^{51}O)_mSO_3M^{51} \quad (13)$$

In the formula, $R^{51}$ represents a hydrocarbon group having 8 or more and 20 or less carbon atoms; $A^{51}$ represents an alkylene group having 2 or more and 4 or less carbon atoms; $M^{51}$ represents a hydrogen atom, an alkali metal, or $NH_4$; and m is a number of 0 or more and 4 or less in terms of an average value.

The anionic surfactant may be used alone or may be used in combination of two or more thereof.

<Nonionic Surfactant>

Examples of the nonionic surfactant include one having a hydrophobic group, such as an alkyl group, and a nonionic hydrophilic group, such as a polyoxyethylene group. From the viewpoint of cleaning performance, the hydrophobic group is preferably a hydrocarbon group, and more preferably an alkyl group. From the viewpoint of enhancement in dispersibility of the modified hydroxyalkyl cellulose in water, the carbon number of the hydrophobic group is preferably 8 or more, more preferably 10 or more, and still more preferably 12 or more, and it is preferably 18 or less, more preferably 16 or less, and still more preferably 14 or less.

Examples of the nonionic surfactant include a nonionic surfactant having a polyoxyalkylene group, an alkyl polyglycoside, and an alkyl glyceryl ether. Of these, a nonionic surfactant having a polyoxyalkylene group is preferably, and at least one selected from a polyoxyalkylene alkyl ether, a polyoxyalkylene alkenyl ether, a polyoxyalkylene sorbitan fatty acid ester, a polyoxyalkylene fatty acid ester, and a polyoxyethylene/polyoxypropylene block polymer is more preferred from the viewpoint of cleaning performance; and a polyoxyalkylene alkyl ether is still more preferred from the standpoint that the dispersibility of the modified hydroxyalkyl cellulose in water is excellent.

From the viewpoint of cleaning performance, the oxyalkylene group is preferably an oxyethylene group or an oxypropylene group, and more preferably an oxyethylene group. The carbon number of the oxyalkylene group is preferably 2 or more and 3 or less.

From the viewpoint of enhancement in dispersibility of the modified hydroxyalkyl cellulose in water, an average addition molar number of the oxyalkylene group is preferably 5 or more, more preferably 6 or more, and still more preferably 7 or more, and it is preferably 20 or less, more preferably 18 or less, still more preferably 16 or less, yet still more preferably 14 or less, and even yet still more preferably 12 or less.

The nonionic surfactant may be used alone or may be used in combination of two or more thereof.

In the present invention, an amide-based nonionic surfactant may be contained as the nonionic surfactant. From the viewpoint of cleaning performance and promotion in adsorption of the modified hydroxyalkyl cellulose, the content of the amide-based nonionic surfactant is preferably 5 parts by mass or less, more preferably 3 parts by mass or less, still more preferably 1 part by mass or less, and yet still more preferably 0.1 parts by mass or less, and it may be 0 part by mass or more, and even yet still more preferably 0 part by mass, based on 1 part by mass of the modified hydroxyalkyl cellulose.

Examples of the amide-based nonionic surfactant include a fatty acid alkanol amide-based surfactant, and any of a monoalkanolamide and a dialkanolamide may be used. Ones having a hydroxyalkyl group having 2 to 3 carbon atoms are easily available, and examples thereof include oleic acid diethanolamide, a palm kernel oil fatty acid diethanolamide, a coconut oil fatty acid diethanolamide, lauric acid diethanolamide, a polyoxyethylene coconut oil fatty acid monoethanolamide, a coconut oil fatty acid monoethanolamide, lauric acid isopropanolamide, and lauric acid monoethanolamide. Of these, natural fatty acid diethanolamides are versatile, and examples thereof include a coconut fatty acid diethanolamide (e.g., Cocamide DEA (1:1) and Cocamide DEA (1:2)) and a palm kernel oil fatty acid diethanolamide (e.g., palm kernel fatty acid amide DEA).

Examples of the aliphatic alkanolamide-based surfactant include a compound represented by the following formula (14).

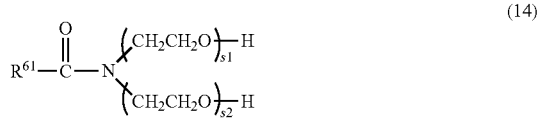

(14)

In the formula (14), $R^{61}$ represents an alkyl group or an alkenyl group each having 7 to 19 carbon atoms; s1 and s2 each independently represent an integer of 0 to 10; and (s1+s2)≥1.

The composition of the present invention has to have only at least one selected from the anionic surfactant and the nonionic surfactant. From the viewpoint of obtaining higher cleaning performance, it is preferred that the composition has both the anionic surfactant and the nonionic surfactant.

<Formulation of Composition>

The composition of the present invention contains at least the modified hydroxyalkyl cellulose and at least one selected from the anionic surfactant and the nonionic surfactant.

In the composition of the present invention, from the viewpoint of cleaning performance, a mass ratio of the total content of the anionic surfactant and the nonionic surfactant to the content of the modified hydroxyalkyl cellulose [(the total content of the anionic surfactant and the nonionic surfactant)/(the content of the modified hydroxyalkyl cellulose)] is preferably 0.1 or more, more preferably 1 or more, still more preferably 10 or more, and yet still more preferably 30 or more, and it is preferably 2.000 or less, more preferably 1,000 or less, still more preferably 500 or less, yet still more preferably 300 or less, and even yet still more preferably 200 or less.

The composition of the present invention may further contain other component in addition to the aforementioned components, as the need arises. In the case of using the composition of the present invention as a cleaning agent composition for clothes, water, known alkaline agents, chelating agents, organic solvents, and dispersants, and the like may be contained, and from the viewpoint of stability, water is preferably contained.

<Application>

It is preferred that the composition of the present invention is used as a cleaning agent composition. It may be considered that when washed with the composition of the present invention, the modified hydroxyalkyl cellulose adsorbs on the surface of a clothing or the like, and a soil becomes easy to be removed, so that cleaning properties of a soil during cleaning can be enhanced. In consequence, more excellent cleaning properties are obtained during next washing.

From the viewpoint of more revealing the effects of the present invention, the aforementioned soil is preferably an oily soil, such as a sebum soil.

In the case of using the composition of the present invention as a cleaning agent composition, from the viewpoint of more revealing the effects of the present invention, its object is preferably a hydrophobic surface.

It is preferred to use the composition of the present invention as a cleaning agent composition for clothes.

In the case where the composition of the present invention is, for example, a cleaning agent composition for clothes, it is preferably diluted with a solvent, such as water, during use. The composition of the present invention may be diluted during use depending upon an application thereof.

As for the modified hydroxyalkyl cellulose of the present invention, from the viewpoint of cleaning performance, its concentration in the aqueous solution during treating an object, such as clothes, is preferably 0.01 mg/L or more, more preferably 0.1 mg/L or more, still more preferably 0.3 mg/L or more, and yet still more preferably 0.5 mg/L or more, and from the viewpoint of economy, it is preferably 10,000 mg/L or less, more preferably 1,000 mg/L or less, still more preferably 500 mg/L or less, and yet still more preferably 100 mg/L or less.

The present invention further discloses the following <1> to <98>.

<1> A composition containing a modified hydroxyalkyl cellulose and at least one selected from an anionic surfactant and a nonionic surfactant, the modified hydroxyalkyl cellulose being one in which a cationic group and a hydrophobic group represented by the formula (1) are bound to a group resulting from eliminating a hydrogen atom from a hydroxy group of a hydroxyalkyl cellulose.

(1)

In the formula (1), Z represents a single bond or a hydrocarbon group having an oxygen atom; $R^1$ represents a hydrocarbon group having 2 or more carbon atoms; and * represents a binding position to a group resulting from eliminating a hydrogen atom from a hydroxy group of a hydroxyalkyl cellulose.

<2> The composition as set forth in <1>, wherein the modified hydroxyalkyl cellulose is modified hydroxyethyl cellulose.

<3> The composition as set forth in <1> or <2>, wherein the degree of substitution of the hydroxyalkyl group in the hydroxyalkyl cellulose is 1.5 or more.

<4> The composition as set forth in any of <1> to <3>, wherein the degree of substitution of the hydroxyalkyl group in the hydroxyalkyl cellulose is 3 or less.

<5> The composition as set forth in any of <1> to <4>, wherein the weight average molecular weight of the hydroxyalkyl cellulose is 130,000 or more.

<6> The composition as set forth in any of <1> to <5>, wherein the weight average molecular weight of the hydroxyalkyl cellulose is 1,200,000 or less.

<7> The composition as set forth in any of <1> to <5>, wherein the weight average molecular weight of the hydroxyalkyl cellulose is 790,000 or less.

<8> The composition as set forth in any of <1> to <5>, wherein the weight average molecular weight of the hydroxyalkyl cellulose is 400,000 or less.

<9> The composition as set forth in any of <1> to <8>, wherein the cationic group includes a quaternary ammonium cation.

<10> The composition as set forth in any of <1> to <9>, wherein the cationic group is represented by the formula (2-1) or formula (2-2).

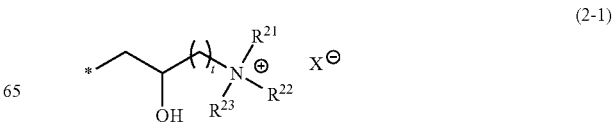

(2-1)

-continued

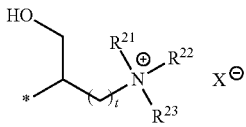

(2-2)

In the formula (2-1) and formula (2-2), $R^{21}$ to $R^{23}$ each independently represent a hydrocarbon group having 1 or more and 4 or less carbon atoms; $X^-$ represents an anion; t represents an integer of 0 or more and 3 or less; and * represents a binding position to a group resulting from eliminating a hydrogen atom from a hydroxy group of the hydroxyalkyl cellulose.

<11> The composition as set forth in <10>, wherein all of $R^{21}$ to $R^{23}$ are a methyl group or an ethyl group.
<12> The composition as set forth in <10>, wherein all of $R^{21}$ to $R^{23}$ are a methyl group.
<13> The composition as set forth in any of <10> to <12>, wherein t is 1.
<14> The composition as set forth in any of <10> to <13>, wherein $X^-$ is at least one selected from a methyl sulfate ion, an ethyl sulfate ion, a chloride ion, and a bromide ion.
<15> The composition as set forth in any of <10> to <13>, wherein $X^-$ is a chloride ion.
<16> The composition as set forth in any of <1> to <15>, wherein the degree of substitution of the cationic group ($MS_c$) in the modified hydroxyalkyl cellulose is 0.01 or more.
<17> The composition as set forth in any of <1> to <15>, wherein the $MS_c$ is 0.02 or more.
<18> The composition as set forth in any of <1> to <15>, wherein the $MS_c$ is 0.05 or more.
<19> The composition as set forth in any of <1> to <15>, wherein the $MS_c$ is 0.07 or more.
<20> The composition as set forth in any of <1> to <19>, wherein the $MS_c$ is 0.2 or less.
<21> The composition as set forth in any of <1> to <19>, wherein the $MS_c$ is 0.15 or less.
<22> The composition as set forth in any of <1> to <19>, wherein the $MS_c$ is 0.1 or less.
<23> The composition as set forth in any of <1> to <22>, wherein $R^1$ is an alkyl group.
<24> The composition asset forth in any of <1> to <23>, wherein the carbon number of $R^1$ is 6 or more.
<25> The composition as set forth in any of <1> to <23>, wherein the carbon number of $R^1$ is 8 or more.
<26> The composition as set forth in any of <1> to <23>, wherein the carbon number of $R^1$ is 10 or more.
<27> The composition as set forth in any of <1> to <26>, wherein the carbon number of $R^1$ is 24 or less.
<28> The composition as set forth in any of <1> to <26>, wherein the carbon number of $R^1$ is 18 or less.
<29> The composition as set forth in any of <1> to <26>, wherein the carbon number of $R^1$ is 16 or less.
<30> The composition as set forth in any of <1> to <26>, wherein the carbon number of $R^1$ is 14 or less.
<31> The composition as set forth in any of <1> to <30>, wherein the molar average carbon number of $R^1$ is 4 or more.
<32> The composition as set forth in any of <1> to <30>, wherein the molar average carbon number of $R^1$ is 7 or more.
<33> The composition as set forth in any of <1> to <30>, wherein the molar average carbon number of $R^1$ is 10 or more.
<34> The composition as set forth in any of <1> to <33>, wherein the molar average carbon number of $R^1$ is 24 or less.
<35> The composition as set forth in any of <1> to <33>, wherein the molar average carbon number of $R^1$ is 18 or less.
<36> The composition as set forth in any of <1> to <33>, wherein the molar average carbon number of $R^1$ is 14 or less.
<37> The composition as set forth in any of <1> to <36>, wherein the proportion of the hydrocarbon group having 9 or more carbon atoms in the hydrocarbon group $R^1$ is 25 mol % or more.
<38> The composition as set forth in any of <1> to <36>, wherein the proportion of the hydrocarbon group having 9 or more carbon atoms in the hydrocarbon group $R^1$ is 50 mol % or more.
<39> The composition as set forth in any of <1> to <36>, wherein the proportion of the hydrocarbon group having 9 or more carbon atoms in the hydrocarbon group $R^1$ is 70 mol % or more.
<40> The composition as set forth in any of <1> to <36>, wherein the proportion of the hydrocarbon group having 9 or more carbon atoms in the hydrocarbon group $R^1$ is 90 mol % or more.
<41> The composition as set forth in any of <1> to <40>, wherein the proportion of the hydrocarbon group having 9 or more carbon atoms in the hydrocarbon group $R^1$ is 100 mol % or less.
<42> The composition as set forth in any of <1> to <36>, wherein the proportion of the hydrocarbon group having 9 or more carbon atoms in the hydrocarbon group $R^1$ is 100 mol %.
<43> The composition as set forth in any of <1> to <42>, wherein the group represented by the formula (1) includes a group represented by any one of the following formulae (1-1-1) to (1-4).

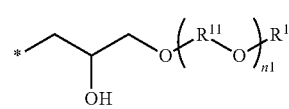

(1-1-1)

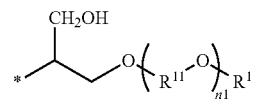

(1-1-2)

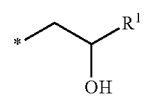

(1-2-1)

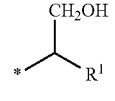

(1-2-2)

*—$R^1$  (1-3)

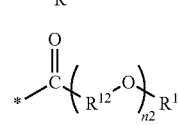

(1-4)

In the formula (1-1-1) to formula (1-4). $R^{11}$ and $R^{12}$ each independently represent an alkylene group having 2 to 4 carbon atoms; $R^1$ is synonymous with $R^1$ in the formula (1); * represents a binding position to a group resulting from eliminating a hydrogen atom from a hydroxy group of the hydroxyalkyl cellulose; n1 represents an addition molar number of —$R^{11}$—O—; n2 represents an addition molar number of —$R^{12}$—O—; and n1 and n2 are each an integer of 0 or more and 30 or less.

<44> The composition as set forth in <43>, wherein $R^{11}$ and $R^{12}$ are each an ethylene group.
<45> The composition as set forth in <43> or <44>, wherein n1 and n2 are each 20 or less.
<46> The composition as set forth in <43> or <44>, wherein n1 and n2 are each 10 or less.
<47> The composition as set forth in <43> or <44>, wherein n1 and n2 are each 5 or less.
<48> The composition as set forth in <43> or <44>, wherein n1 and n2 are each 3 or less.
<49> The composition as set forth in <43> or <44>, wherein n1 and n2 are each 1 or less.
<50> The composition asset forth in any of <43> to <49>, wherein n1 and n2 are each 0 or more.
<51> The composition as set forth in <43> or <44>, wherein n1 and n2 are each 0.
<52> The composition as set forth in any of <43> to <51>, wherein the average addition molar number of each of —$R^{11}$—O— and —$R^{12}$—O— is 20 or less.
<53> The composition as set forth in any of <43> to <51>, wherein the average addition molar number of each of —$R^{11}$—O— and —$R^{12}$—O— is 10 or less.
<54> The composition as set forth in any of <43> to <51>, wherein the average addition molar number of each of —$R^{11}$—O— and —$R^{12}$—O— is 5 or less.
<55> The composition as set forth in any of <43> to <51>, wherein the average addition molar number of each of —$R^{11}$—O— and —$R^{12}$—O— is 3 or less.
<56> The composition as set forth in any of <43> to <51>, wherein the average addition molar number of each of —$R^{11}$—O— and —$R^{12}$—O— is 1 or less.
<57> The composition as set forth in any of <43> to <56>, wherein the average addition molar number of each of —$R^{11}$—O— and —$R^{12}$—O— is 0 or more.
<58> The composition asset forth in any of <43> to <57>, wherein the group represented by the formula (1) includes at least one selected from the groups represented by the formula (1-1-1), formula (1-1-2), formula (1-2-1), and formula (1-2-2).
<59> The composition as set forth in any of <43> to <57>, wherein the group represented by the formula (1) includes at least one selected from the groups represented by the formula (1-1-1) and formula (11-2).
<60> The composition as set forth in any of <1> to <59>, wherein the degree of substitution of the hydrophobic group ($MS_R$) in the modified hydroxyalkyl cellulose is 0.005 or more.
<61> The composition as set forth in any of <1> to <59>, wherein the $MS_R$ is 0.008 or more.
<62> The composition as set forth in any of <1> to <59>, wherein the $MS_R$ is 0.01 or more.
<63> The composition as set forth in any of <1> to <59>, wherein the $MS_R$ is 0.015 or more.
<64> The composition as set forth in any of <1> to <63>, wherein the $MS_R$ is 0.06 or less.
<65> The composition as set forth in any of <1> to <63>, wherein the $MS_R$ is 0.05 or less.
<66> The composition as set forth in any of <1> to <63>, wherein the $MS_R$ is 0.04 or less.
<67> The composition as set forth in any of <1> to <63>, wherein the $MS_R$ is 0.03 or less.
<68> The composition as set forth in any of <1> to <67>, wherein the ratio ($MS_R/MS_C$) of the degree of substitution of the hydrophobic group ($MS_R$) to the degree of substitution of the cationic group ($MS_C$) in the modified hydroxyalkyl cellulose is preferably 0.001 or more, more preferably 0.005 or more, still more preferably 0.01 or more, and yet still more preferably 0.05 or more, and it is preferably 10 or less, more preferably 5 or less, still more preferably 3 or less, yet still more preferably 2 or less, even still more preferably 1.2 or less, even still more preferably 0.8 or less, even still more further preferably 0.6 or less, even yet still more further preferably 0.5 or less, and even yet still more further preferably 0.3 or less.
<69> The composition as set forth in any of <1> to <68>, wherein the hydrophobic group and the cationic group are bound to a group resulting from eliminating a hydrogen atom of a different hydroxy group which the hydroxyalkyl cellulose has.
<70> The composition as set forth in any of <1> to <69>, wherein the ratio ($MS_A/MS_C$) of the degree of substitution of the anionic group ($MS_A$) to the degree of substitution of the cationic group ($MS_C$) in the modified hydroxyalkyl cellulose is 0.5 or less.
<71> The composition as set forth in any of <1> to <69>, wherein the $MS_A/MS_C$ is 0.1 or less.
<72> The composition as set forth in any of <1> to <71>, wherein the $MS_A/MS_C$ is 0 or more.
<73> The composition as set forth in any of <1> to <69>, wherein the $MS_A/MS_C$ is 0.
<74> The composition as set forth in any of <1> to <73>, wherein the degree of substitution of the glycerol group in the modified hydroxyalkyl cellulose is less than 0.5.
<75> The composition as set forth in any of <1> to <73>, wherein the degree of substitution of the glycerol group is less than 0.1.
<76> The composition as set forth in any of <1> to <75>, wherein the degree of substitution of the glycerol group is 0 or more.
<77> The composition as set forth in any of <1> to <73>, wherein the degree of substitution of the glycerol group is 0.
<78> The composition as set forth in any of <1> to <77>, wherein the anionic surfactant is selected from a terminal anionic surfactant in which an anionic group is bound to a hydrophobic group of a surfactant, preferably a primary carbon atom of an alkyl group or a phenyl group; and an internal anionic surfactant in which an anionic group is bound to a hydrophobic group, preferably a secondary carbon atom of an alkyl group.
<79> The composition asset forth in any of <1> to <78>, wherein the anionic surfactant is at least one selected from LAS, AS, AES, IOS, and HAS.
<80> The composition as set forth in any of <1> to <78>, wherein the anionic surfactant is AES.
<81> The composition as set forth in <78>, wherein the carbon number of the alkyl group of the terminal anionic surfactant is 12 or more.
<82> The composition as set forth in <78> or <81>, wherein the carbon number of the alkyl group of the terminal anionic surfactant is 14 or less.
<83> The composition asset forth in <78>, wherein the carbon number of the alkyl group of the internal anionic surfactant is 16 or more.
<84> The composition as set forth in <78> or <83>, wherein the carbon number of the alkyl group of the internal anionic surfactant is 18 or less.
<85> The composition asset forth in any of <1> to <84>, wherein the nonionic surfactant is a nonionic surfactant having a polyoxyalkylene group.
<86> The composition asset forth in any of <1> to <84>, wherein the nonionic surfactant is a polyoxyalkylene alkyl ether.
<87> The composition asset forth in any of <1> to <86>, wherein the content of an amide-based nonionic surfactant is 5 parts by mass or less based on 1 part by mass of the modified hydroxyalkyl cellulose.

<88> The composition as set forth in any of <1> to <86>, wherein the content of the amide-based nonionic surfactant is 3 parts by mass or less based on 1 part by mass of the modified hydroxyalkyl cellulose.

<89> The composition as set forth in any of <1> to <86>, wherein the content of the amide-based nonionic surfactant is 1 part by mass or less based on 1 part by mass of the modified hydroxyalkyl cellulose.

<90> The composition as set forth in any of <1> to <86>, wherein the content of the amide-based nonionic surfactant is 0.1 parts by mass or less based on 1 part by mass of the modified hydroxyalkyl cellulose.

<91> The composition asset forth in any of <1> to <90>, wherein the content of the amide-based nonionic surfactant is 0 part by mass or more based on 1 part by mass of the modified hydroxyalkyl cellulose.

<92> The composition as set forth in any of <1> to <86>, wherein the content of the amide-based nonionic surfactant is 0 part by mass based on 1 part by mass of the modified hydroxyalkyl cellulose.

<93> The composition as set forth in any of <1> to <92>, having both the anionic surfactant and the nonionic surfactant.

<94> The composition as set forth in any of <1> to <93>, containing water.

<95> The composition as set forth in any of <1> to <94>, which is a cleaning agent composition.

<96> The composition as set forth in any of <1> to <94>, which is a cleaning agent composition for clothes.

<97> The composition as set forth in any of <1> to <96>, wherein the concentration in the aqueous solution during treatment is preferably 0.01 mg/L or more, more preferably 0.1 mg/L or more, still more preferably 0.3 mg/L or more, and yet still more preferably 0.5 mg/L or more, and it is preferably 10,000 mg/L or less, more preferably 1,000 mg/L or less, still more preferably 500 mg/L or less, and yet still more preferably 100 mg/L or less.

<98> Use of the composition as set forth in any on <1> to <97> on the hydrophobic surface of the composition.

EXAMPLES

The measuring methods adopted in Examples and Comparative Examples are as follows.

[Measurement of Degree of Substitution (Molar Average Degree of Substitution (MS))]

Pretreatment 1 g of a powdery modified hydroxyalkyl cellulose was dissolved in 100 g of ion-exchanged water, and then, an aqueous solution was charged in a dialytic membrane (Spectra/Por, molecular weight cutoff: 1,000) and subjected to dialysis for 2 days. The resulting aqueous solution was freeze-dried with a freeze dryer (eyela, FDU1100), to obtain a purified modified hydroxyalkyl cellulose.

<Calculation of Mass of Cationic Group by Kjeldahl Method>

200 mg of the purified modified hydroxyalkyl cellulose was accurately metered, to which were then added 10 mL of sulfuric acid and one tablet of a Kjedahl tablet (manufactured by Merck), followed by undergoing thermal decomposition with a Kjedahl decomposition apparatus (K-432, manufactured by BUCHI). After completion of decomposition, 30 mL of ion-exchanged water was added to the sample, and the nitrogen content (% by mass) of the sample was determined using an automatic Kjedahl distillation apparatus (K-370, manufactured by BUCHI), thereby calculating the mass of the cationic group.

<Calculation of Mass of Hydrophobic Group (Alkyl Group) by Zeisel Method>

A calculation method of the mass of an alkyl group that is the hydrocarbon group is hereunder described while referring to the case of Example 1 (using lauryl glycidyl ether as an introducing agent of the hydrocarbon group) as an example. It is also possible to measure the case of using other introducing agent by appropriately selecting a sample for calibration curve (such as an iodoalkane and a hydrocarbon group-introducing agent).

200 mg of the purified cellulose derivative and 220 mg of adipic acid were accurately metered in a 10-mL vial (Mighty Vial No. 3), to which were then added 3 mL of an internal standard solution (tetradecane/o-xylene=1/25 (v/v)) and 3 mL of hydroiodic acid, followed by sealing up. In addition, a sample for calibration curve having 2, 4, or 9 mg of 1-iodododecane added thereto in place of the cellulose derivative was prepared. Each of the samples was heated under a condition at 160° C. for 2 hours by using a block heater (Reacti-ThermIII Heating/Stirring module, manufactured by PIERCE) while stirring with a stirrer chip. The sample was allowed to stand for cooling, and then, an upper layer (o-xylene layer) was recovered and analyzed for the amount of 1-iodododecane through gas chromatography (GC-2010 plus, manufactured by Shimadzu Corporation).

Condition for GC Analysis

Column: Agilent's HP-1 (length: 30 m, liquid phase membrane thickness: 0.25 µL, inner diameter: 32 mm)

Split ratio: 20

Column temperature: 100° C. (2 min)→10° C./min→300° C. (15 min)

Injector temperature: 300° C.

Detector: FID

Detector temperature: 330° C.

Amount of implantation: 2 µL

The mass of the alkyl group in the sample was determined from the detection amount of 1-iodododecane obtained through GC.

<Measurement of Mass of Hydroxyalkyl Group>

The mass of the alkyl group was measured in the same manner as in the aforementioned measurement of the mass of the alkyl group by quantitatively determining the hydroxyalkyl group-derived alkyl iodide.

<Calculation of Degree of Substitution (Molar Average Degree of Substitution) of Each of Cationic Group, Hydrophobic Group, and Hydroxyalkyl Group>

From the masses of the aforementioned cationic group and hydrophobic group (alkyl group) and the masses of all of the samples, the mass of the HEC structure was calculated and converted into a substance amount (mol), respectively, thereby calculating the degree of substitution ($MS_C$) of the cationic group and the degree of substitution ($MS_R$) of the alkyl group that is the hydrophobic group.

The raw materials used for the synthesis of the modified hydroxyalkyl cellulose are as follows.

Natrosol 250 GR: HEC (weight average molecular weight: 300,000, degree of substitution of hydroxyethyl group: 2.5, manufactured by Ashland Inc.)

Natrosol 250 HR: HEC (weight average molecular weight: 1,000,000, degree of substitution of hydroxyethyl group: 2.5, manufactured by Ashland Inc.)

Natrosol 250 JR: HEC (weight average molecular weight: 150,000, degree of substitution of hydroxyethyl group: 2.5, manufactured by Ashland Inc.)

IPA: 2-Propanol
LA-EP: Lauryl glycidyl ether, manufactured by Yokkaichi Chemical Co., Ltd.
1,2-Epoxytetradecane, manufactured by Wako Pure Chemical Industries, Ltd.
GMAC: Glycidyl trimethylammonium chloride, "SY-GTA80", manufactured by Sakamoto Yakuhin Kogyo Co., Ltd.

Synthesis Example 1: Synthesis of Modified Hydroxyalkyl Cellulose (M-HEC-1)

90 g of Natrosol 250 GR as the hydroxyalkyl cellulose was charged in a 1-L separable flask, and nitrogen was allowed to pass therethrough. 77.2 g of ion-exchanged water and 414.5 g of IPA were added and stirred for 5 minutes, and then, 10.9 g of a 48% sodium hydroxide aqueous solution was added, followed by further stirring for 15 minutes. Subsequently, 4.5 g of LA-EP was added as the hydrophobizing agent, to undergo a hydrophobization reaction at 80° C. for 5 hours. Furthermore, 10.3 g of GMAC was added as the cationizing agent, to undergo a cationization reaction at 50° C. for 1.5 hours. Thereafter, 10.9 g of a 90% by mass acetic acid aqueous solution was added, and stirring was performed for 30 minutes, to undergo a neutralization reaction.

The resulting suspension liquid was transferred equally into two 500-mL centrifuge tubes and centrifuged with a high-speed cooling centrifuge (CR21G III, manufactured by Hitachi Koki Co., Ltd.) at 1,500 G for 40 seconds. A supernatant was removed through decantation, and an 85% by mass IPA aqueous solution in the same amount as that of the removed supernatant was added, to undergo redispersion. Again, the operation of centrifugation and redispersion was repeated, and after performing the third centrifugation, a precipitate was taken out. The resulting precipitate was vacuum-dried at 80° C. for 12 hours by using a vacuum dryer (VR-420, manufactured by Advantec Co., Ltd.) and then crushed with an extreme mill (MX-1200XTM, manufactured by Waring), to obtain powdery modified hydroxyethyl cellulose (M-HEC-1).

The degree of substitution of the cationic group ($MS_C$) and the degree of substitution of the hydrophobic group (alkyl group) ($MS_R$) of the resulting M-HEC-1 were 0.085 and 0.02, respectively.

Synthesis Examples 2 to 10

Powdery modified hydroxyethyl celluloses (M-HEC-2 to M-HEC-10) were obtained by following the same operation as in Synthesis Example 1, except that the hydroxyalkyl cellulose, the hydrophobizing agent, and the cationizing agent as used were changed to those shown in Table 1.

Synthesis Example 11

Powdery modified hydroxyethyl cellulose (M-HEC-11) was obtained in the same manner as in Synthesis Example 1, except for changing 4.5 g of LA-EP to 12.8 g of 1,2-epoxytetradecane.

TABLE 1

| | Modified hydroxyalkyl cellulose | Hydroxyalkyl cellulose | Hydrophobizing agent | | Cationizing agent GMAC | | |
|---|---|---|---|---|---|---|---|
| | | | Kind | (g) | (g) | $MST_R$ | $MS_C$ |
| Synthesis Example 1 | M-HEC-1 | Natrosol 250 GR | LA-EP | 4.5 | 10.3 | 0.02 | 0.085 |
| Synthesis Example 2 | M-HEC-2 | Natrosol 250 HR | LA-EP | 3.7 | 12.3 | 0.02 | 0.085 |
| Synthesis Example 3 | M-HEC-3 | Natrosol 250 JR | LA-EP | 3.5 | 14.1 | 0.02 | 0.085 |
| Synthesis Example 4 | M-HEC-4 | Natrosol 250 GR | LA-EP | 2.0 | 13.4 | 0.01 | 0.085 |
| Synthesis Example 5 | M-HEC-5 | Natrosol 250 GR | LA-EP | 8.9 | 12.3 | 0.04 | 0.085 |
| Synthesis Example 6 | M-HEC-6 | Natrosol 250 GR | LA-EP | 3.4 | 3.0 | 0.02 | 0.02 |
| Synthesis Example 7 | M-HEC-7 | Natrosol 250 GR | LA-EP | 3.2 | 18.4 | 0.02 | 0.14 |
| Synthesis Example 8 | M-HEC-8 | Natrosol 250 GR | LA-EP | 2.1 | 2.6 | 0.01 | 0.02 |
| Synthesis Example 9 | M-HEC-9 | Natrosol 250 GR | LA-EP | 8.5 | 4.8 | 0.04 | 0.02 |
| Synthesis Example 10 | M-HEC-10 | Natrosol 250 GR | LA-EP | 7.8 | 18.3 | 0.04 | 0.14 |
| Synthesis Example 11 | M-HEC-11 | Natrosol 250 GR | 1,2-Epoxytetradecane | 12.8 | 3.0 | 0.02 | 0.02 |

In M-HEC-1 to M-HEC-11, as for $R^1$ of the hydrophobic group, the molar average carbon number is 12, and the proportion of the hydrocarbon group having 9 or more carbon atoms is 100 mol %.

Synthesis Example 12: Synthesis of C16IOS

In a flask equipped with a stirring device, 7,000 g of 1-hexadecanol (a product name: KALCOL 6098, manufactured by Kao corporation) and 700 g of γ-alumina (manufactured by Strem Chemicals, Inc.) were charged and allowed to react with each other at 280° C. under stirring while passing nitrogen (7,000 mL/min) into the system, thereby obtaining a crude internal olefin having a purity of the C16 olefin of 99.6%. The crude internal olefin was distilled at 136 to 160° C. and 4.0 mmHg, thereby obtaining an internal olefin having 16 carbon atoms and an olefin purity of 100%. The double bond distribution of the resulting internal olefin was as follows: C1 position: 2.3%; C2 position: 23.6%; C3 position: 18.9%; C4 position: 17.6%; C5 position: 13.6%; C6 position: 11.4%; and C7 and C8 positions: 7.4% in total.

The aforementioned internal olefin was charged in a thin-film sulfonation reactor and subjected to a sulfonation reaction with an $SO_3$ gas under a condition of passing cooling water at 20° C. through an external jacket of the reactor. A molar ratio of the reaction molar ratio $[(SO_3)/$ (internal olefin)$]$ was set to 1.005. The resulting sulfonated product was mixed with a potassium hydroxide aqueous solution in an amount corresponding to 1.05 molar times relative to the theoretical acid value and neutralized at 30° C. for 1 hour. The neutralized product was heated in an autoclave at 170° C. for 1 hour to undergo hydrolysis. The resultant was decolored with hydrogen peroxide in an amount of 1.0% by mass relative to the sulfonated product and reduced with sodium sulfite in an amount of 0.15% by mass relative to the sulfonated product, thereby obtaining an internal olefin potassium sulfonate having 16 carbon atoms (C16IOS).

A mass ratio (HAS/IOS) of the hydroxy body to the olefin body in the C16IOS was found to be 84/16. The content of the raw material internal olefin in the solid component of the C16IOS was 0.5% by mass, and the content of the inorganic compound was 1.2% by mass.

Examples 1 to 23 and Comparative Example 1 to 6

[Evaluation of Cleaning Performance]
(1) Preparation of Chemical Fibers for Cleaning Evaluation A 1-liter beaker was charged with 1.2 mL of a composition having a formulation described below, 598.8 mL of water having a hardness of 4° dH, and 5 sheets of polyester fabrics having been cut in a regular square of 6 cm×6 cm (a polyester faille, manufactured by Senshoku Shizai K.K.). A propeller for stirring was connected to a motor ("Three-One Motor", manufactured by Shinto Scientific Co., Ltd.) set up in such a manner that the rotation direction changed at every 10 seconds, and the inside of the beaker was stirred at 200 r/min for 5 minutes.

Subsequently, the polyester fabrics were dehydrated with a twin tub washing machine (PS-H45L Type, manufactured by Hitachi, Ltd.) for 1 minute. Thereafter, the polyester fabrics were charged in a 1-L beaker in which 600 mL of water having a hardness of 4° dH had been charged, and stirring was performed under the same condition as mentioned above. Subsequently, the polyester fabrics were dehydrated with the aforementioned twin tub washing machine for 1 minute and then naturally dried for 12 hours.

<Formulation of Composition>

The compositions of the present invention were prepared in blending formulations shown in Tables 2 and 3. Each of the blending amounts is an amount in terms of solid content (an active amount). Ion-exchanged water was blended in such a manner that a sum total of the composition was 100 parts by mass. The respective components used are as follows.

Modified hydroxyalkyl celluloses: M-HEC-1 to M-HEC-11 synthesized in Synthesis Examples 1 to 11

C12ES: Polyoxyethylene (2) lauryl ether sodium sulfate, "EMAL 270J", manufactured by Kao Corporation C12EO10: Polyoxyethylene (10) lauryl ether (LAURETH-10)

LAS: Sodium dodecylbenzenesulfonate, "NEOPELEX G-65", manufactured by Kao Corporation C12AS: Sodium lauryl sulfate, "EMAL 2F Paste", manufactured by Kao Corporation C16IOS: C16IOS obtained in Synthesis Example 12

Cocamide DEA: Palm kernel oil fatty acid diethanolamide, "AMINON PK-02S", manufactured by Kao Corporation HEC: "Natrosol 250 GR", manufactured by Ashland Inc.

A-HEC: Prepared in the same manner as in Synthesis Example 1, except that the hydrophobizing agent was changed to 11.4 g of 1,2-epoxytetradecane (manufactured by Wako Pure Chemical Industries, Ltd.), and the reaction with the cationizing agent was not performed.

C-HEC: Prepared in the same manner as in Synthesis Example 1, except that the amount of GMAC was changed to 7.8 g, and the reaction with the hydrophobizing agent was not performed.

SL100: "SoftCAT™ SL Polymer SL100", manufactured by The Dow Chemical Company (2) Preparation of Soiled Fabric 0.1 mL of the following model sebum artificial soiled liquid was uniformly applied on the polyester fabrics (36 $cm^2$) prepared in the above (1) and then dried by allowing to stand at room temperature for 3 hours <Model Sebum Artificial Soiled Liquid>

Oleic acid: 35% by mass

Triolein: 30% by mass

Squalene: 10% by mass

2-Ethylhexyl palmitate: 25% by mass

The foregoing mixture was mixed with 0.02% by mass Sudan III, to prepare the model sebum artificial soiled liquid.

(3) Cleaning Test

The soiled fabric obtained in the above (2) was subjected to the same operation as in the above (1).

[Evaluation of Cleaning Rate]

Reflectances of a polyester raw fabric before contamination and polyester fabrics before and after cleaning at 460 nm were measured with a spectrophotometer (SE-2000, manufactured by Nippon Denshoku Industries Co., Ltd.), and the cleaning rate (%) was determined according to the following equation.

$$\text{Cleaning rate (\%)} = 100 \times [\{(\text{Reflectance after cleaning}) - (\text{Reflectance before cleaning})\} / \{(\text{Reflectance of raw fabric}) - (\text{Reflectance before cleaning})\}]$$

TABLE 2

| | Composition | | | | |
|---|---|---|---|---|---|
| | Modified hydroxyalkyl cellulose | | C12ES | C12EO10 | |
| | Kind | Blending amount (parts by mass) | Blending amount (parts by mass) | Blending amount (parts by mass) | Cleaning rate (%) |
| Example 1 | M-HEC-1 | 0.3 | 5 | 5 | 56 |
| Example 2 | M-HEC-2 | 0.3 | 5 | 5 | 54 |
| Example 3 | M-HEC-3 | 0.3 | 5 | 5 | 41 |
| Example 4 | M-HEC-4 | 0.3 | 5 | 5 | 41 |
| Example 5 | M-HEC-5 | 0.3 | 5 | 5 | 23 |
| Example 6 | M-HEC-6 | 0.3 | 5 | 5 | 48 |
| Example 7 | M-HEC-7 | 0.3 | 5 | 5 | 49 |
| Example 8 | M-HEC-8 | 0.3 | 5 | 5 | 34 |
| Example 9 | M-HEC-9 | 0.3 | 5 | 5 | 48 |
| Example 10 | M-HEC-10 | 0.3 | 5 | 5 | 40 |
| Example 11 | M-HEC-11 | 0.3 | 5 | 5 | 42 |
| Example 12 | M-HEC-1 | 0.15 | 2.5 | 2.5 | 37 |
| Comparative Example 1 | — | 0 | 5 | 5 | 9 |
| Comparative Example 2 | M-HEC-1 | 0.3 | 0 | 0 | 12 |
| Comparative Example 3 | HEC | 0.3 | 5 | 5 | 9 |
| Comparative Example 4 | A-HEC | 0.3 | 5 | 5 | 12 |
| Comparative Example 5 | C-HEC | 0.3 | 5 | 5 | 18 |
| Comparative Example 6 | SL100 | 0.3 | 5 | 5 | 13 |

TABLE 3

| | Composition | | | | | | | |
|---|---|---|---|---|---|---|---|---|
| | Modified hydroxyethyl cellulose | | Anionic surfactant | | Nonionic surfactant | | Mass ratio [(Surfactant)/ | |
| | Kind | Blending amount (parts by mass) | Kind | Blending amount (parts by mass) | Kind | Blending amount (parts by mass) | (Modified hydroxyethyl cellulose)] | Cleaning rate (%) |
| Example 1 | M-HEC-1 | 0.3 | C12ES | 5 | C12EO10 | 5 | 33 | 56 |
| Example 13 | M-HEC-1 | 0.05 | C12ES | 5 | C12EO10 | 5 | 200 | 23 |
| Example 14 | M-HEC-1 | 1 | C12ES | 5 | C12EO10 | 5 | 10 | 59 |
| Example 15 | M-HEC-1 | 0.3 | C12ES | 0.5 | C12EO10 | 0.5 | 3 | 26 |
| Example 16 | M-HEC-1 | 0.3 | C12AS | 5 | C12EO10 | 5 | 33 | 53 |
| Example 17 | M-HEC-1 | 0.3 | LAS | 5 | C12EO10 | 5 | 33 | 44 |
| Example 18 | M-HEC-1 | 0.3 | C16IOS | 5 | C12EO10 | 5 | 33 | 55 |
| Example 19 | M-HEC-1 | 0.3 | C12ES | 10 | — | 0 | 33 | 58 |
| Example 20 | M-HEC-1 | 0.3 | C16IOS | 10 | — | 0 | 33 | 56 |
| Example 21 | M-HEC-1 | 0.3 | — | 0 | C12EO10 | 10 | 33 | 52 |
| Example 22 | M-HEC-1 | 0.3 | C12ES | 5 | — | 0 | 17 | 51 |
| Example 23 | M-HEC-1 | 0.3 | C12ES | 5 | Cocamide DEA | 0.1 | 17 | 25 |
| Comparative Example 1 | — | 0 | C12AS | 5 | C12EO10 | 5 | — | 9 |
| Comparative Example 2 | M-HEC-1 | 0.3 | — | 0 | — | 0 | 0 | 12 |

As is clear from Tables 2 and 3, it has been clarified that the cleaning properties of the sebum soil are enhanced through the treatment with the composition of the present invention.

On the other hand, according to the hydroxyalkyl cellulose into which only the cationic group was introduced (C-HEC), the hydroxyalkyl cellulose into which only the hydrophobic group was introduced (A-HEC), and Softcat into which the cationic group having a hydrophobic group was introduced, the sufficient cleaning performance was not obtained.

As compared with the case of using singly the anionic surfactant or the nonionic surfactant, in the case of using the both in combination, the high cleaning performance was obtained.

As compared with the case using the Cocamide DEA that is an amide-based nonionic surfactant, in the case of not using the same, the high cleaning performance was obtained.

INDUSTRIAL APPLICABILITY

In accordance with the present invention, when treating an object, such as clothing, easiness of soil removal during cleaning can be enhanced. The composition of the present invention is suitable for use as a cleaning agent composition for clothing, and extremely excellent effects, such as enhancement in cleaning performance against the clothing or the like, as treated with such a composition, can be provided.

The invention claimed is:

1. A composition comprising:
   a modified hydroxyalkyl cellulose; and
   at least one selected from an anionic surfactant and a nonionic surfactant,
   wherein the modified hydroxyalkyl cellulose is one in which a cationic group and a hydrophobic group are bound to a group resulting from eliminating a hydrogen atom from a hydroxy group of a hydroxyalkyl cellulose, and
   wherein the hydrophobic group comprises at least one selected from a hydrophobic group represented by the following formula (1-1-1) and a hydrophobic group represented by the following formula (1-1-2):

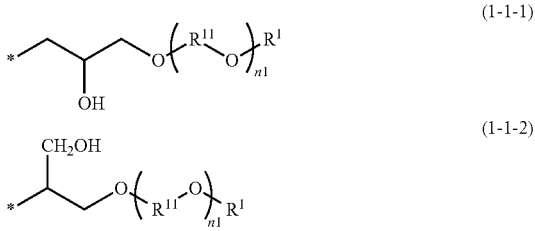

(1-1-1)

(1-1-2)

wherein:
   $R^{11}$ represents an alkylene group having 2 to 4 carbon atoms;
   $R^1$ represents a hydrocarbon group having 2-14 carbon atoms;
   * represents a binding position to a group resulting from eliminating a hydrogen atom from a hydroxy group of the hydroxyalkyl cellulose;
   n1 represents an addition molar number of —$R^{11}$—O—; and
   n1 is an integer of 0 or more and 30 or less.

2. The composition according to claim 1, wherein the cationic group comprises a quaternary ammonium cation.

3. The composition according to claim 1, wherein the cationic group is represented by the formula (2-1) or formula (2-2):

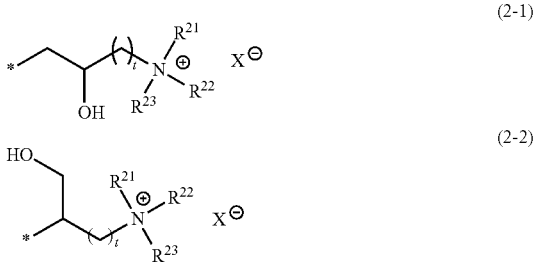

(2-1)

(2-2)

wherein,
   $R^{21}$ to $R^{23}$ each independently represent a hydrocarbon group having 1 or more and 4 or less carbon atoms; $X^-$ represents an anion; t represents an integer of 0 or more and 3 or less; and * represents a binding position to a group resulting from eliminating a hydrogen atom from a hydroxy group of the hydroxyalkyl cellulose.

4. The composition according to claim 1, comprising the anionic surfactant and the nonionic surfactant.

5. The composition according to claim 1, wherein the content of an amide-based nonionic surfactant that is the nonionic surfactant is 5 parts by mass or less based on 1 part by mass of the modified hydroxyalkyl cellulose.

6. The composition according to claim 1, wherein a degree of substitution of the cationic group in the modified hydroxyalkyl cellulose is 0.001 or more and 1 or less.

7. The composition according to claim 1, wherein a degree of substitution of the hydrophobic groups represented by the formula (1-1-1) and formula (1-1-2) in the modified hydroxyalkyl cellulose is 0.0001 or more and 1 or less.

8. The composition according to claim 1, wherein a weight average molecular weight of the hydroxyalkyl cellulose is 1,000 or more and 3,000,000 or less.

9. The composition according to claim 1, wherein a mass ratio of the total content of the anionic surfactant and the nonionic surfactant to the content of the modified hydroxyalkyl cellulose [(the total content of the anionic surfactant and the nonionic surfactant)/(the content of the modified hydroxyalkyl cellulose)] is 0.1 or more and 2,000 or less.

10. The composition according to claim 1, further comprising water.

11. The composition according to claim 1, wherein a ratio ($MS_R/MS_C$) of the degree of substitution ($MS_R$) of the hydrophobic group to the degree of substitution ($MS_C$) of the cationic group in the modified hydroxyalkyl cellulose is 0.001 or more and 10 or less.

12. A method of cleaning clothes, said method comprising contacting said clothes with the composition according to claim 1.

13. A method of cleaning a hydrophobic surface, said method comprising contacting said hydrophobic surface with the composition according to claim 1.

14. The composition according to claim 1, wherein the composition comprises an anionic surfactant.

15. The composition according to claim 1, wherein the composition comprises a nonionic surfactant.

16. The composition according to claim 1, wherein the hydrophobic group comprises a hydrophobic group represented by formula (1-1-1).

17. The composition according to claim 1, wherein $R^1$ represents a hydrocarbon group having 2-12 carbon atoms.

18. The composition according to claim 1, wherein the hydrophobic group comprises a hydrophobic group represented by formula (1-1-2).

* * * * *